(12) United States Patent
Shi et al.

(10) Patent No.: US 8,553,776 B2
(45) Date of Patent: Oct. 8, 2013

(54) METHOD AND APPARATUS FOR MOTION VECTOR ASSIGNMENT

(75) Inventors: Fang Shi, San Diego, CA (US); Vijayalakshmi R. Raveendran, San Diego, CA (US)

(73) Assignee: Qualcomm Inorporated, San Diego, CA (US)

( * ) Notice: Subject to any disclaimer, the term of this patent is extended or adjusted under 35 U.S.C. 154(b) by 2028 days.

(21) Appl. No.: 11/186,679

(22) Filed: Jul. 20, 2005

(65) Prior Publication Data

US 2006/0018383 A1 Jan. 26, 2006

Related U.S. Application Data

(60) Provisional application No. 60/590,110, filed on Jul. 21, 2004.

(51) Int. Cl.
*H04N 7/12* (2006.01)
*H04N 11/02* (2006.01)
*G06K 9/46* (2006.01)

(52) U.S. Cl.
USPC ............... 375/240.16; 382/236; 382/300

(58) Field of Classification Search
USPC ............................................. 375/240.16
See application file for complete search history.

(56) References Cited

U.S. PATENT DOCUMENTS

| 3,670,096 A | 6/1972 | Candy et al. |
| 5,168,394 A | 12/1992 | Sasho |
| 5,198,902 A | 3/1993 | Richards et al. |
| 5,387,947 A | 2/1995 | Shin |
| 5,394,196 A | 2/1995 | Robert ............ 348/699 |
| 5,784,107 A | 7/1998 | Takahashi |
| 5,844,616 A | 12/1998 | Collet et al. |
| 5,995,154 A | 11/1999 | Heimburger |
| 6,008,865 A | 12/1999 | Fogel |
| 6,043,846 A | 3/2000 | Shen et al. |
| 6,101,220 A | 8/2000 | Ando |
| 6,192,079 B1 | 2/2001 | Sharma et al. |
| 6,208,760 B1 | 3/2001 | De Haan et al. |

(Continued)

FOREIGN PATENT DOCUMENTS

| CL | 01532007 | 11/2007 |
| CL | 07862007 | 11/2007 |

(Continued)

OTHER PUBLICATIONS

International Search Report—PCT/US2005/025897, International Search Authority—European Patent Office—Oct. 25, 2005.

(Continued)

*Primary Examiner* — Anner Holder
(74) *Attorney, Agent, or Firm* — Arent Fox LLP

(57) ABSTRACT

A method for processing a plurality of motion vectors for a video frame to be interpolated using a first reference frame and a second reference frame, each reference frame having a content map, the method including partitioning the video frame to be interpolated into a plurality of areas; determining a number of motion vectors passing through one area of the plurality of areas based on the content maps of the first reference frame and the second reference frame; and generating a motion vector to assign to the one area based on the number of motion vectors passing through the one area. An apparatus for performing the method is also described.

44 Claims, 9 Drawing Sheets

(56) References Cited

U.S. PATENT DOCUMENTS

| | | | |
|---|---|---|---|
| 6,229,570 B1 | 5/2001 | Bugwadia et al. | |
| 6,229,925 B1 | 5/2001 | Alexandre et al. | |
| 6,330,535 B1 | 12/2001 | Yasunaga et al. | |
| 6,345,247 B1 | 2/2002 | Yasunaga et al. | |
| 6,404,901 B1* | 6/2002 | Itokawa | 382/103 |
| 6,424,676 B1 | 7/2002 | Kono et al. | |
| 6,480,541 B1 | 11/2002 | Girod et al. | |
| 6,560,371 B1 | 5/2003 | Song et al. | |
| 6,597,738 B1 | 7/2003 | Park et al. | |
| 6,618,439 B1 | 9/2003 | Kuo et al. | |
| 6,625,333 B1* | 9/2003 | Wang et al. | 382/300 |
| 6,654,420 B1 | 11/2003 | Snook | |
| 6,704,357 B1 | 3/2004 | Ketcham | |
| 6,728,317 B1 | 4/2004 | Demos | |
| 7,003,038 B2 | 2/2006 | Divakaran et al. | |
| 7,042,941 B1 | 5/2006 | Laksono et al. | |
| 7,075,986 B2 | 7/2006 | Girod et al. | |
| 7,116,716 B2 | 10/2006 | Ma et al. | |
| 7,215,710 B2 | 5/2007 | Yamada et al. | |
| 7,280,708 B2 | 10/2007 | Song et al. | |
| 7,343,044 B2* | 3/2008 | Baba et al. | 382/236 |
| 7,457,471 B2 | 11/2008 | Song et al. | |
| 7,577,196 B2 | 8/2009 | Ducloux et al. | |
| 2004/0017852 A1 | 1/2004 | Garrido et al. | |
| 2005/0005301 A1 | 1/2005 | Song et al. | |
| 2005/0265451 A1 | 12/2005 | Shi et al. | |
| 2006/0002465 A1 | 1/2006 | Raveendran et al. | |
| 2006/0159359 A1 | 7/2006 | Lee | |
| 2006/0165176 A1 | 7/2006 | Raveendran et al. | |
| 2007/0064800 A1 | 3/2007 | Ha | |
| 2007/0230563 A1 | 10/2007 | Tian et al. | |
| 2007/0230564 A1 | 10/2007 | Chen et al. | |
| 2007/0230578 A1 | 10/2007 | Shi et al. | |
| 2008/0002862 A1* | 1/2008 | Matsugu et al. | 382/115 |
| 2008/0112606 A1* | 5/2008 | Lee et al. | 382/133 |
| 2013/0188742 A1 | 7/2013 | Raveendran et al. | |

FOREIGN PATENT DOCUMENTS

| | | |
|---|---|---|
| EP | 0018856 | 11/1980 |
| EP | 0782343 A2 | 7/1997 |
| EP | 0881836 A1 | 12/1998 |
| EP | 0883298 A2 | 12/1998 |
| EP | 1287492 | 3/2003 |
| EP | 1369820 A2 | 5/2003 |
| EP | 1481546 | 9/2003 |
| EP | 1357750 | 10/2003 |
| EP | 1383322 | 1/2004 |
| EP | 1617678 A2 | 1/2006 |
| GB | 2316568 A | 2/1998 |
| JP | 08191448 | 7/1996 |
| JP | 08223536 | 8/1996 |
| JP | 8256340 A | 10/1996 |
| JP | 10066033 A | 3/1998 |
| JP | 11112940 A | 4/1999 |
| JP | 11177940 A | 7/1999 |
| JP | H11510937 A | 9/1999 |
| JP | 2000134585 A | 5/2000 |
| JP | 2000512091 | 9/2000 |
| JP | 2003515987 T | 5/2003 |
| JP | 2003274415 A | 9/2003 |
| JP | 2003348596 A | 12/2003 |
| JP | 2004112229 | 4/2004 |
| JP | 2005526457 A | 9/2005 |
| JP | 2008526119 A | 7/2008 |
| JP | 2009510937 | 3/2009 |
| JP | 2009532990 A | 9/2009 |
| JP | 2010136383 A | 6/2010 |
| KR | 1019990082104 | 11/1999 |
| KR | 20030073254 A | 9/2003 |
| RU | 2201654 | 3/2003 |
| RU | 2182727 | 2/2009 |
| TW | 480885 B | 3/2002 |
| WO | WO9216071 | 9/1992 |
| WO | WO9728507 A1 | 8/1997 |
| WO | 9746020 A2 | 12/1997 |
| WO | 9746022 A2 | 12/1997 |
| WO | WO0133864 | 5/2001 |
| WO | WO2004025965 | 3/2004 |
| WO | WO2006007527 | 1/2006 |
| WO | WO2007115325 | 10/2007 |

OTHER PUBLICATIONS

Written Opinion—PCT/US2005/025897, International Search Authority—European Patent Office—Oct. 25, 2005.

International Preliminary Report on Patentability—PCT/US2005/025897, International Search Authority—The International Bureau of WIPO—Geneva, Switzerland—Jan. 27, 2007.

A. Kaup et al.: "Efficient prediction of uncovered background in interframe coding using spatial extrapolation", Institute for Communication Engineering, Aachen University of Technology (RWTH), vol. 5, pp. 501-504, 1994.

"Advanced Video Coding for Generic Audiovisual Services," International Telecommunication Union ITU-T Standardization Sector; Series-H:Audiovisual and Multimedia Systems; H.264; May 2003.

A.M. Tekalp, "Digital Video Processing", Oppenheim, ed, Prentice Hall Signal Processing Series, Upper Saddle River, NJ 1995.

De Bruijn F.J., et al., "Efficient video coding integrating MPEG-2 and picture-rate conversion," IEEE Transactions on Consumer Electronics, IEEE Service Center, Aug. 2002; vol. 48, No. 3, pp. 688-693.

Castagno et al., "A Method for Motion Adaptive Frame Rate Up-Conversion," IEEE Transactions on Circuits and Systems for Video Technology, Piscataway, NJ, USA, vol. 6, No. 5,Oct. 1996, pp. 436-445.

Chen, Tao, "Adaptive Temporal Interpolation Using Bidirectional Motion Estimation and Compensation," Institute of Electrical and Electronics Engineers: Proceedings 21002 International Conference on Image Processing, ICIP, Rochester, NY, Sep. 22-25, 2002, IEEE, US, vol. 2, pp. 313-316.

Dane G., et al., "Encoder-Assisted Adaptive Video Frame Interpolation," IEEE International Conference on Acoustics, Speech, and Signal Processing, 2005; (ICASSP '05)., IEEE, vol. 2, Mar. 18, 2005, pp. 349-352.

Flierl, et al., "Generalized B Pictures and the Draft H.264/AVC Video-Compression Standard", IEEE Transactions on Circuits and Systems for Video Technology, vol. 13, No. 7, pp. 587-597, Jul. 2003.

"Forward Link Only Air Interface Specification for Terrestrial Mobile Multimedia Multicast: TIA-1099" EIA Standards, Telecomm. Industry Assoc., Aug. 2006, XP017005609, Arlington, VA, Secs. 5.2.1.2..9.2.7, 5.2.1.2.9.2.8, 5.2.1.2.10.

Fukunaga, et al., "MPEG-4 Video Verification Model Version 16.0, XP000861688 Section 37," International Organization for Standardization, Mar. 2000, N3312, p. 1-380.

G. Dane and T.Q. Nguyen, "Motion vector processing for frame rate up conversion" in IEEE international Conference on Acoustics, Speech, and Signal Processing, pp. 309-312, May 2004.

Gallant et al.: "Efficient scalable DCT-based video coding at low bit rates", Image Processing, 1999. IC 99. International Conference on Kobe, Japan Oct. 24-28, 1999, Piscataway, NJ, USA, IEEE, US, vol. 3, pp. 782-786, XP010368741.

Ghandi M. et al., Layered H.264 Video Transmission with Hierarchical QAM [Online] May 1, 2005, pp. 1-17, xp002446009, URL:http//mahdi/ghandi.ws/papers/jvcir06.

Inazumi, et al., "Estimation of the Optimal Frame Rate for Video Communications Under Bit-Rate Constraints, Scripta Technica, New York, USA, Part I, XP001171954," Electronics & Communications in Japan Part I—Communications, 2003, 86 (12), 54-67.

Kim, et al., A new video interpolation technique based on motion-adaptive subsampling This work was supported by Jeoju University, Korea. IEEE Transactions on Consumer Electronics, IEEE Service Center, New York, U.S. LNKD-DOI:10.1109/30.793602, vol. 45, No. 3, Aug. 1, 1999, pp. 782-787, XP011083800.

Liu et al., "Adaptive Video Multicast over the Internet", IEEE Computer Society, 2003, pp. 22-33.

Liu et al.: "MCI-Embedded Motion-Compensated Prediction for Quality Enhancement of Frame Interpolation", Proceedings of the

(56) References Cited

OTHER PUBLICATIONS

SPIE—The International Society for Optical Engineering, Multimedia Systems and Applications III, vol. 4209, Nov. 6, 2000, pp. 251-261, XP002351712, Boston, MA, USA, 2001, abstract, Section 1, pp. 251-252, Section 2, pp. 253-254, Section 4, pp. 256-257.
Puri et al.: "An Interframe Coding Scheme for Packet Video", Proceedings of the SPIE, Belingham, VA, US, vol. 1199, No. Part 3, Nov. 8, 1989, pp. 1610-1619, XP000568683, abstract section 3, p. 1611 Section 5, pp. 1612-1613 with figures 2 and 4.
Puri et al.: "Video Coding with Motion-Compensated Interpolation for CD-ROM Applications", Signal Processing Image Communication, Elsevier Science Publishers, Amsterdam, NL vol. 2, No. 2, Aug. 1, 1990, pp. 127-144, XP000243473 abstract section 4, pp. 130-132.
Pyun et al., "Scene-Adaptive Frame-Layer Rate Control for Low Bit Rate Video,Tokyo, Japan, XP001184530," IEICE Transactions on Fundamentals of Electronics, Communications and Computer Sciences, Institute of Electronics Information and Comm. Eng.., 2003, E86-A (10), 2618-2622.
R. Thoma et al.: "Motion compensating interpolation considering covered and uncovered background", Signal Processing: Image Compression 1, pp. 191-212, 1989.
Sasai et al., "Frame-Rate Up-Conversion Using Reliable Analysis of Transmitted Motion Information ,Quebec, Canada, May 17-21, 2004, Piscataway, NJ, USA, IEEE XP010718914," Acoustics,Speech, and Signal Processing, 2004, IEEE International Conference on Montreal, 2004, 5, 257-260.
Sasai et al.: "B-Picture Coding with Motion-Compensated Frame Rate up Conversion", Proceedings of the SPIE—The International Society for Optical Engineering, Image and Video Communications and Processing 2005, vol. 5685, Jan. 18, 2005, p. 792-800, XP002351713 San Jose, CA, USA, 2005 abstract Sections 3.1 and 3.3.
Schwarz H. et al., "Combined Scalability Support for the Scalable Extension of H.264/AVC," Multimedia and Expo, 2005. ICME 2005. IEEE International Conference on Amsterdam, The Netherlands, Jul. 6, 2006, pp. 446-449,XP010843292.

Schwarz H et al., "MCTF and Scalability Extension of H. 264/AVC," Internet Citation, [Online] Dec. 15, 2004, XP002368924, URL: http;//ip.hhi.de/imagecom_G1/savcw/documents/PCS2004.
Sullivan et al.: "Rate-Distortion Optimization for Video Compression", IEEE Signal Processing Magazine, IEEE Service Center, Piscataway, NJ, US, vol. 15, No. 6, Nov. 1998, pp. 74-90, XP001064929, Sub-section "Distortion Measures", pp. 78-79 Sub-section "Optimization Techniques", pp. 80-81 Sub-sub-section Variable Block Sizes, p. 82, paragraph entitled "Case 1", p. 82 Sub-section "Intra/Inter/Skip Mode Decision", pp. 84-85 Sub-section "Comparison to Other Encoding Strategies", p. 87-88.
T. Kuo et al.: "Motion-compensated interpolation for low-bit-rage video quality enhancement" in Proc. SPIE Applications of Digital Image Processing, vol. 3460, p. 277-288, 1998.
Thomas Wiegand: "Joint Model No. 1, Revision 1 (JM-IRL)", ITU Study Group 16-Video Coding Experts Group, 3 Dec. 200 (Dec. 3, 2001), pp. 1, 3-75, XP001086627 Section 5, pp. 40-44 Appendix I, pp. 50-57.
Wiegand, T. et al: "Rate-Constrained Coder Control and Comparison of Video Coding Standards", IEEE Transactions on Circuits and Systems for Video Technology, IEEE Service Center, Piscataway, NJ, US, vol. 13, No. 7, pp. 688-703, Jul. 2003.
Hatori, Yoshiritsu et al., Digital Image Network, 1st edition, The Institute of Image Information and Television Engineers (edited by), Kabushiki Kaisha Koronasha, Dec. 25, 2002, pp. 22 to 23, ISBN: 4-339-01262-9.
Lee Sung-Hee et al; "Weighted-adaptive motion-compensated frame rate up-conversion", IEEE Transactions on Consumer Electronics, IEEE Service Center, New York, NY, US, vol. 49, No. 3, Aug. 1, 2003, pp. 485-492, XP002290775, ISSN: 0098-3063, DOI: 10.1109/TCE.2003.1233759.
Lee, Sung-Hee et al; "Adaptive motion-compensated interpolation for frame rate up-conversion" IEEE Transactions on Consumer Electronics, vol. 48, No. 3, Aug. 2002, pp. 444-450.
Taiwan Search Report—TW094124726—TIP0—Sep. 9, 2011.
Telecommunication Standarization Sector of ITU: "Recommendation H.264 Advanced Video Coding for Generic Audiovisual Services," ITU-T Recommendations, International Telecommendation Union, Geneva, CH, No. H264, Mar. 2005.

\* cited by examiner

METHOD AND APPARATUS FOR MOTION VECTOR ASSIGNMENT

CLAIM OF PRIORITY UNDER 35 U.S.C. §119

The present Application for Patent claims priority to Provisional Application No. 60/590,110, file Jul. 21, 2004 and assigned to the assignee hereof and hereby expressly incorporated by reference herein.

REFERENCE TO CO-PENDING APPLICATIONS FOR PATENT

The present Application for Patent is related to the following co-pending U.S. patent applications:

"Method and Apparatus for Motion Compensated Frame Rate Up Conversion for Block-Based Low Bit-Rate Video", having U.S. application Ser. No. 11/122,678, filed concurrently herewith, assigned to the assignee hereof, and expressly incorporated by reference herein.

BACKGROUND

1. Field

The embodiments described herein relate generally to video image processing, and more particularly, to a method and apparatus for motion vector assignment.

2. Background

Low bit rate video compression is very important in many multimedia applications such as wireless video streaming and video telephony, due to the limited bandwidth resources and the variability of available bandwidth. Bandwidth adaptation video coding at low bit-rate can be accomplished by reducing the temporal resolution. In other words, instead of compressing and sending a thirty (30) frame per second (fps) bit-stream, the temporal resolution can be halved to 15 fps to reduce the transmission bit-rate. One typical approach for reducing the bandwidth is through the extraction and removal of redundant information from the encoded signal, such as removing either a portion of or the complete frame. However, the consequence of reducing temporal resolution is the introduction of temporal domain artifacts such as motion jerkiness that significantly degrades the visual quality of the decoded video.

To display the full frame rate at the receiver side, a recovery mechanism, called frame rate up conversion (FRUC), is needed to re-generate the skipped frames and to reduce temporal artifacts. Generally, FRUC is the process of video interpolation at the video decoder to increase the perceived frame rate of the reconstructed video. Many FRUC algorithms have been proposed, and can be classified into two general categories. The first category interpolates the missing frame by using a combination of received video frames without taking object motion into account. Frame repetition and frame averaging methods fit into this class. The drawbacks of these methods include the production of motion jerkiness, "ghost" images and blurring of moving objects when there is motion involved. The second category is more advanced as compared to the first category, and utilizes motion information transmitted by the encoder in a process referred to as motion compensated (frame) interpolation (MCI).

In conventional motion compensated predictive coding, each video frame is first partitioned into square blocks of picture elements (pels); such as blocks of 8 pels by 8 pels. Each block is coded, in turn, and the developed encoded sequence is transmitted over a communications channel to a decoder. During the encoding process, a determination is made as to whether or not the pels of the block have changed significantly compared with a collocated block of a previous frame. If not, an indication is sent that signifies to the decoder that it needs to merely repeat the pels of that block from the previous frame to obtain the pels for the current block. If the pels have changed since the previous frame, an attempt is made to determine the best estimate of motion that is occurring in the block. This is frequently done by a block matching motion estimation technique, where the pels of the current block are successively compared with various small shifts of the corresponding block in the previous frame. The shift that provides the best match is deemed to be the "best estimate" of the displacement in the block's image between frames, and the magnitude and direction of this shift, referred to as a "motion vector," is selected to be sent to the decoder. Also, once the best match is found, the pels of the current block are compared with those of the "best" shifted block from the previous frame to see if there is a significant difference. If not, instead of sending the motion vector, an indication is sent to the decoder so that the pels of the shifted block from the previous frame will be repeated for the pels for the current shifted block. Such blocks are said to have been successfully motion compensated. However, if there is a significant difference between the two blocks, the difference is encoded and sent to the decoder so that the pels of the current block may be more accurately recovered.

There have been some suggestions for improving the quality of the repeated frames in order to make them more faithfully resemble the original. Thus, instead of simply repeating the pels from the previous frame as described above in conventional motion compensated predictive coding, in MCI motion vectors are used to laterally displace a block by the appropriate amount prior to display. In other words, this method creates the missing block of pels by averaging over the immediately previous and following blocks of pels that are available to the decoder. However, experimental results show that when the images of successive blocks do not represent translational motion, the reproduced image may be worse than with frame repeating. Although it has been observed that this degradation is caused by a relatively few pels that do not conform to the assumption of translational motion, putting these pels in the wrong place creates highly visible artifacts.

As illustrated in prior art FIG. 1, in MCI, a missing frame 108 is interpolated based on a reconstructed current frame 102, a stored previous frame 104, and a set of transmitted motion vectors 106. Reconstructed current frame 102 is composed of a set of non-overlapped blocks 150, 152, 154 and 156 associated with set of transmitted motion vectors 106 pointing to corresponding blocks in stored previous frame 104. Interpolated frame 108 can be constructed in either a linear combination of corresponding pixels in current and previous frames; or nonlinear operation such as a median operation.

Although MCI is more advanced, block-based MCI introduces overlapped regions, which are areas having multiple motion trajectories passing through it; and hole regions, which are areas having no motion trajectory passing through it, both of which are unwanted, in interpolated frames. As illustrated in FIG. 2, an interpolated frame 202 contains an overlapped area 206 and a hole area 204. The main reasons for the generation of these two types of unwanted areas are:

1. Moving objects are not under a rigid translational motion model.
2. The transmitted motion vectors used in MCI may not point to the true motion trajectories due to the block-based fast motion search algorithms utilized on the encoder side.
3. The covered and uncovered background in the current frame and previous frames.

The interpolation of overlapped and hole regions is a major technical challenge in conventional block-based motion compensated approaches. Median blurring and spatial interpolation techniques have been proposed to fill these overlapped and hole regions. However, the drawbacks of these methods are the introduction of the blurring and blocking artifacts, and also an increase in the complexity of interpolation operations.

Proper motion vector assignment is important for motion compensated FRUC as it is needed for the interpolated frames in motion compensated FRUC. In addition, proper motion vector assignment is useful in any application where proper motion compensation based on motion vector assignment is needed. Accordingly, there is a need to overcome the issues noted above.

SUMMARY OF THE EMBODIMENTS

The embodiments described herein provide a motion vector assignment process for frames that are to be interpolated having holes and overlapped areas.

In one embodiment, a method for processing a plurality of motion vectors for a video frame to be interpolated using a first reference frame and a second reference frame, each reference frame having a content map, is described. The method includes partitioning the video frame to be interpolated into a plurality of areas; determining a number of motion vectors passing through one area based on the content maps of the first reference frame and the second reference frame; and assigning a motion vector to the one area based on the number of motion vectors passing through the one area.

In another embodiment, a computer readable medium having instructions stored thereon for causing a computer to execute a method for processing a plurality of motion vectors for a video frame to be interpolated using a first reference frame and a second reference frame, each reference frame having a content map, is disclosed. The method includes partitioning the video frame to be interpolated into a plurality of areas; determining a number of motion vectors passing through one area based on the content maps of the first reference frame and the second reference frame; and assigning a motion vector to the one area based on the number of motion vectors passing through the one area.

In yet another embodiment, an apparatus for processing a plurality of motion vectors for a video frame to be interpolated using a first reference frame and a second reference frame, each reference frame having a content map, is disclosed. The apparatus includes means for partitioning the video frame to be interpolated into a plurality of areas; means for determining a number of motion vectors passing through one area based on the content maps of the first reference frame and the second reference frame; and means for assigning a motion vector to the one area based on the number of motion vectors passing through the one area.

In still yet another embodiment, at least one processor configured to implement a method for processing a plurality of motion vectors for a video frame to be interpolated using a first reference frame and a second reference frame, each reference frame having a content map, is disclosed. The method includes partitioning the video frame to be interpolated into a plurality of areas; determining a number of motion vectors passing through one area based on content maps of the first reference frame and the second reference frame; and assigning a motion vector to the one area based on the number of motion vectors passing through the one area.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The embodiments described herein may be more readily understood by referring to the accompanying drawings in which.

Like numerals refer to like parts throughout the several views of the drawings.

DETAILED DESCRIPTION

The embodiments described herein provide motion vector assignment methods and apparatus that supports variable block-size-based, block-based, and pixel-based variations in motion vector assignment. The motion vector assignment methods and apparatus described herein assists in the creation of interpolated frames, also referred to as "F frames," with higher quality in, for example, a process such as a frame rate up conversion (FRUC) process. Supplementary information contained in the decoded video data are utilized as inputs to the motion vector assignment process. Supplementary information may include, for example, a description of the type of graphic elements that make up each frame, referred to as "content maps," as well as a description of the complexity and movement of the elements, referred to as "complexity maps" and "activity maps," respectively. The motion vector assignment described herein addresses such problems encountered during the creation of interpolated frames as overlapped and hole areas, both of which are unwanted in interpolated frames.

Figure 1:
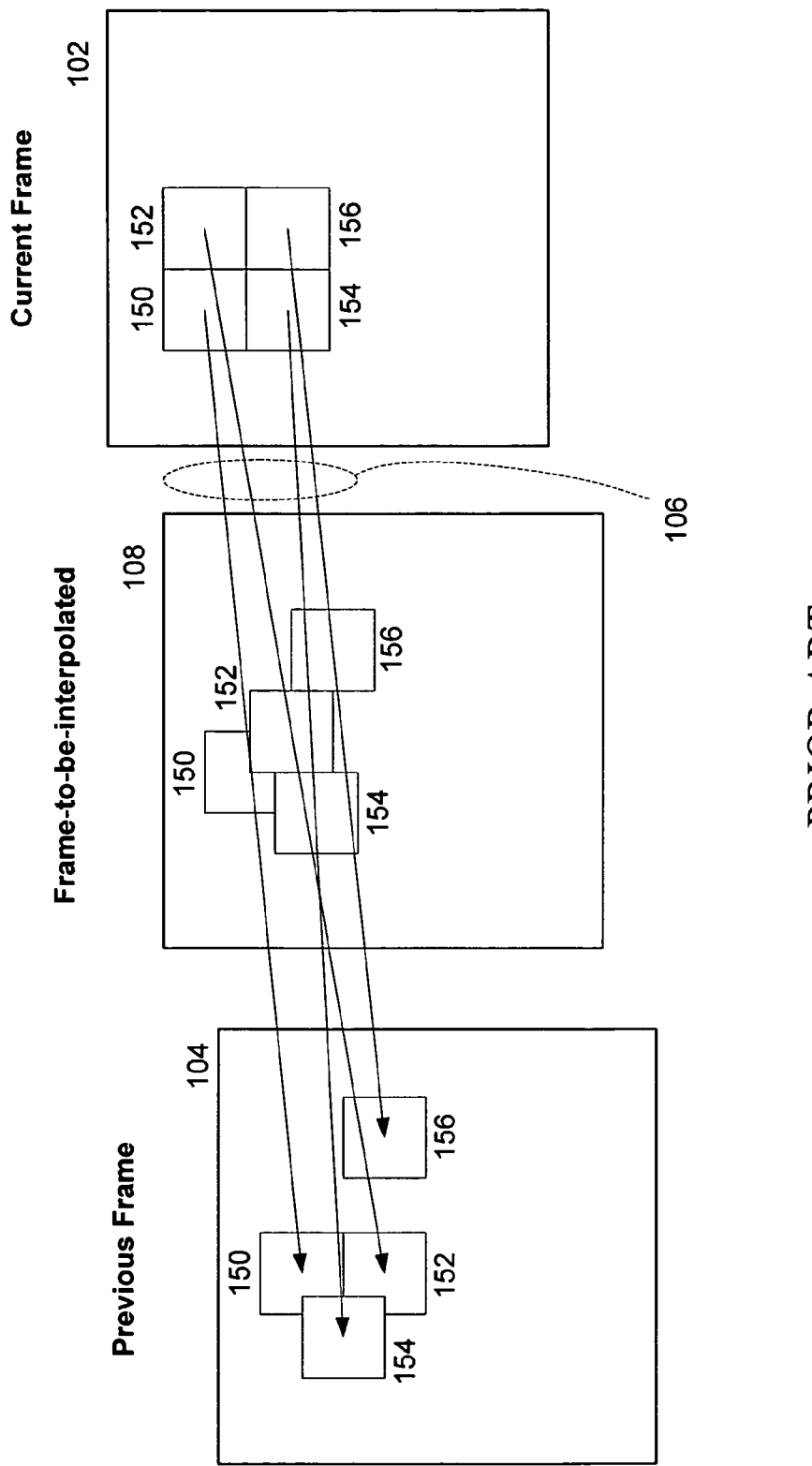
FIG. 1 is a figure illustrating the construction of an interpolated frame using motion compensation interpolation (MCI)
Figure 2:
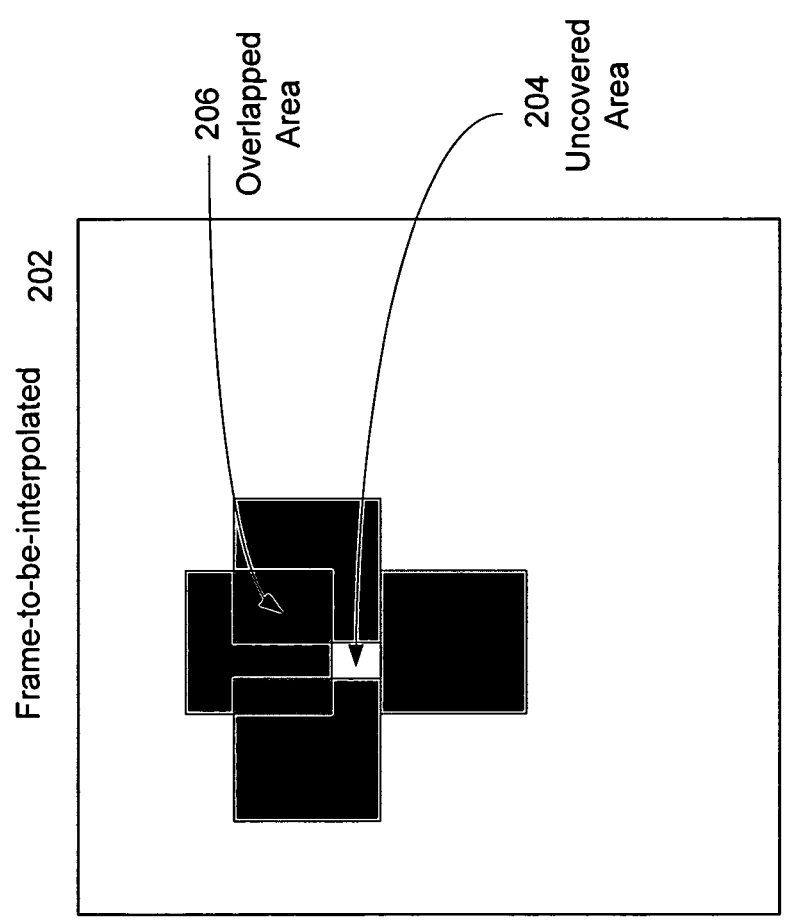
FIG. 2 is a figure illustrating overlapping and hole regions that may be encountered in an interpolated frame during MCI.
Figure 3:
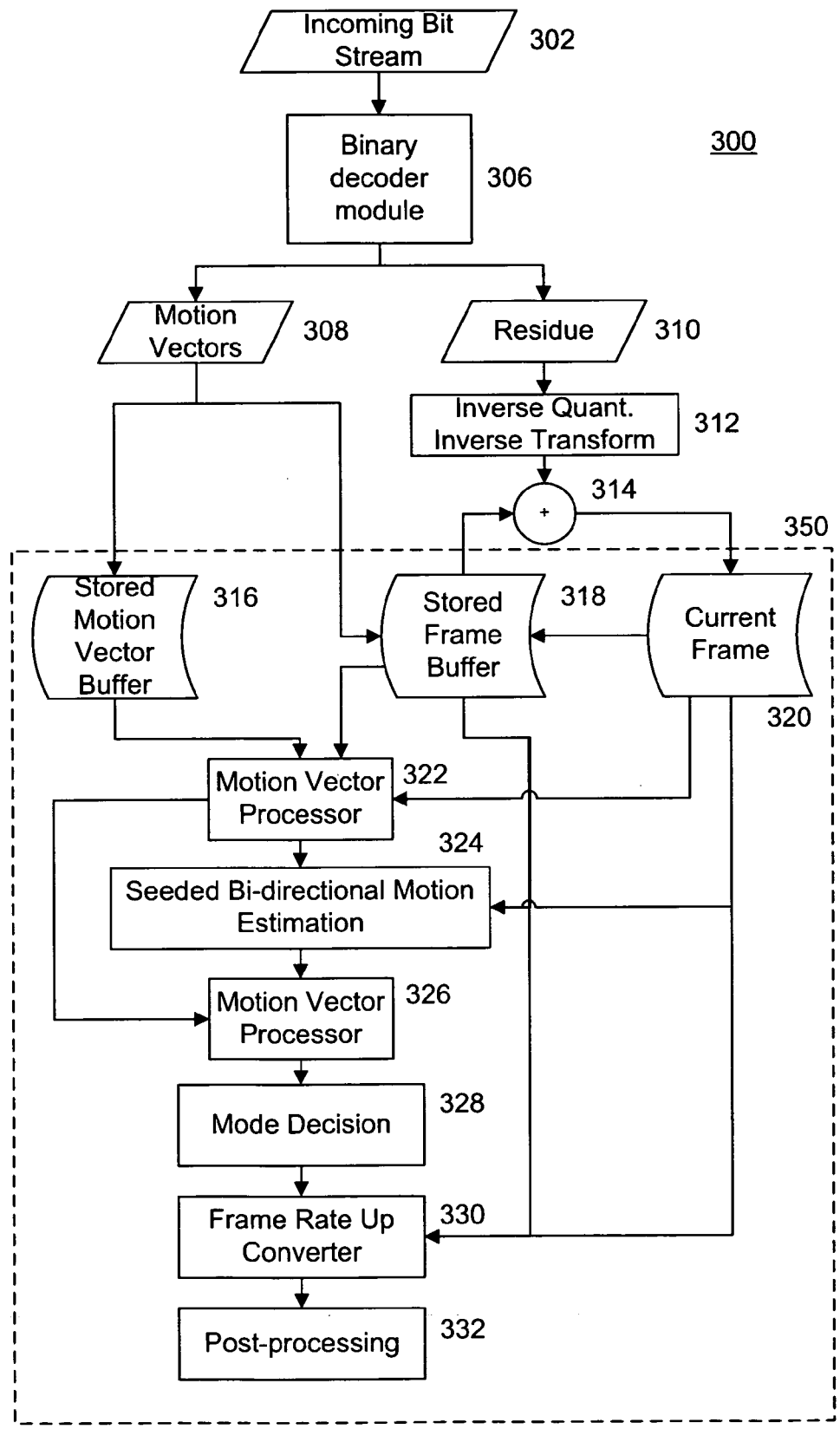
FIG. 3 is a block diagram for a FRUC system for performing motion vector assignment.

FIG. 3 illustrates a FRUC system 300 that is able to perform motion vector assignment for F-frames, also referred to as to-be-interpolated frames, where FRUC system 300 receives an incoming bit stream 302 and uses a binary decoder module 306 to extract: (1) a set of motion vectors 308, which is placed in a stored motion vector buffer 316; and, (2) a residue 310. Residue 310 is input into an inverse quantization/inverse transform module 312, the result of which is combined with a previous frame stored in a stored previous frame buffer 318 to generate a current frame. The current frame is stored in a current frame buffer 320. A sub-portion 350 of FRUC system 300, including stored motion vector buffer 316, stored frame buffer 318, and current frame buffer 320, contains the specific functional modules for performing motion vector assignment in accordance with one exemplary embodiment, as described herein. Specifically, sub-portion 350 include a motion vector processor 322, a seeded bidirectional motion estimation module 324, a second motion vector processor 326, a mode decision module 328, a frame rate up converter (FRUC) module 330, and a post-processing unit 332. The operation of FRUC system 300 is further described below in connection with the description of the figures. In addition, one exemplary motion vector extrapolation and content classification system that may be used with the system described herein is described in co-pending application No. 60/589,990, entitled "Method and Apparatus for Frame Rate Up Conversion". Co-pending application No. PCT/US2005/015450, entitled "Method and Apparatus for Motion Compensated Frame Rate Up Conversion." also provides other exemplary embodiments of the other components of the FRUC system 300 not specifically described herein.

It should be noted that the functional modules shown in FIG. 3, in one embodiment, correspond to specific modules that may be implemented using one or more software algorithms. The operation of the algorithms is described at a high-level with sufficient detail to allow those of ordinary skill in the art to implement them using a combination of hardware and software approaches. For example, the components described herein may be implemented as software executed on a general-purpose processor; as "hardwired" circuitry in an Application Specific Integrated Circuit (ASIC); or any combination thereof. It should be noted that various other approaches to the implementation of the modules described herein may be employed and should be within the realm of those of ordinary skill of the art who practice in the vast field of image and video processing.

Further, the inventive concepts described herein may be used in decoder/encoder systems that are compliant with H.26x-standards as promulgated by the International Telecommunications Union, Telecommunications Standardization Sector (ITU-T); or with MPEGx-standards as promulgated by the Moving Picture Experts Group, a working group of the International Standardization Organization/International Electrotechnical Commission, Joint Technical Committee 1 (ISO/IEC JTC1). The ITU-T video coding standards are called recommendations, and they are denoted with H.26x (e.g., H.261, H.262, H.263 and H.264). The ISO/IEC standards are denoted with MPEG-x (e.g., MPEG-1, MPEG-2 and MPEG-4). For example, multiple reference frames and variable block size are special features required for the H264 standard. In other embodiments, the decoder/encoder systems in which the inventive concepts described herein are used may be proprietary.

In one embodiment, FRUC system 300 may be configured based on different complexity requirements. For example, a high complexity configuration may include multiple reference frame; variable block sizes; previous reference frame motion vector extrapolation with motion acceleration models; and, motion estimation assisted double motion field smoothing. In contrast, a low complexity configuration may only include a single reference frame; fixed block sizes; and motion compensated interpolation with motion field smoothing. Other configurations are also valid for different applications.

Figure 4:
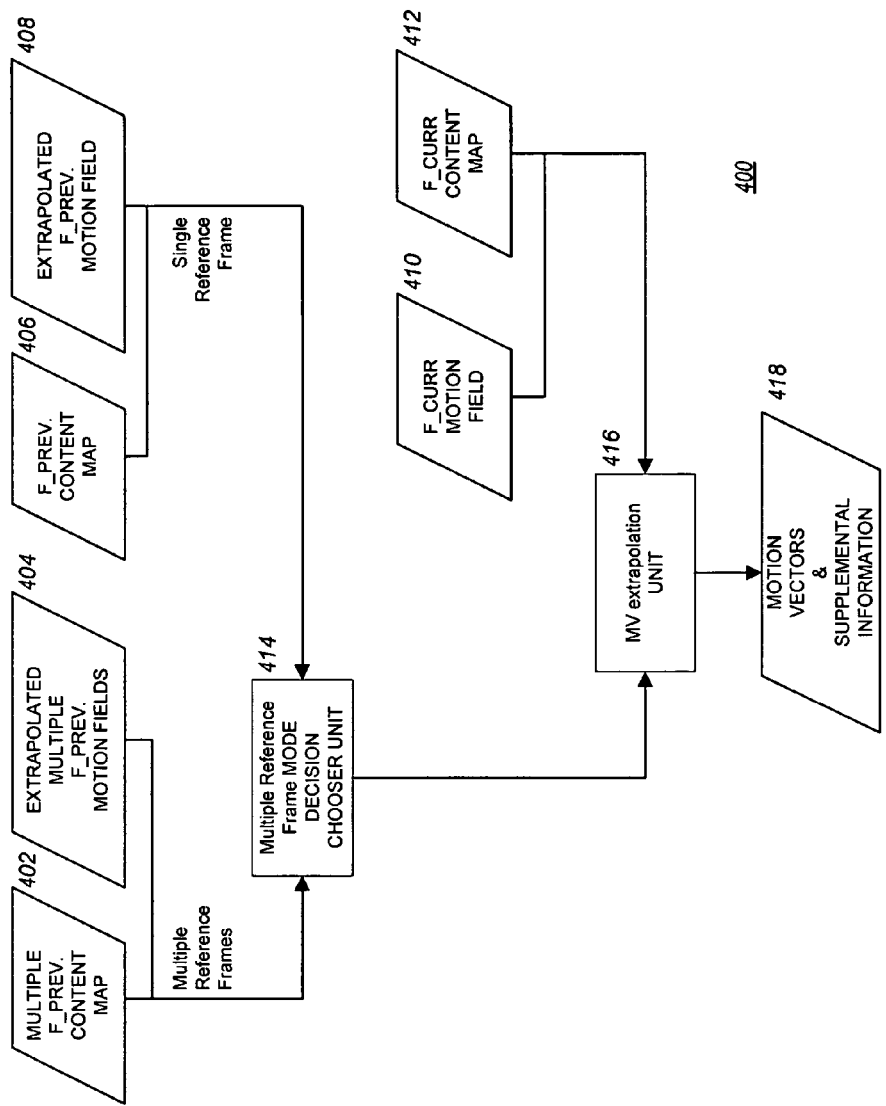
FIG. 4 is a block diagram of a motion vector extraction subsystem of a motion vector a system.

System 300 receives input from a plurality of data storage units in a data subsystem 400 used to store and extract information about the video frames used in the processing. As illustrated in FIG. 4, these storage units include including a multiple previous frames' content maps storage unit (MULTIPLE F_PREV CONTENT MAP) 402; a multiple previous frames' extrapolated motion fields storage unit (EXTRAPOLATED MULTIPLE F_PREV MOTION FIELDS) 404; a single previous frame content map storage unit (F_PREV CONTENT MAP) 406; and a single previous frame extrapolated motion field storage unit (EXTRAPOLATED F_PREV MOTION FIELD) 408. A multiple reference frame mode controller module 414 couples the appropriate storage units to the next stage of input depending on whether system 300 is operating in a mode that utilizes multiple reference frames. Specifically, when system 300 utilizes multiple previous reference frames, the inputs are taken from multiple previous frames' content maps storage unit 402 and multiple previous frames' extrapolated motion fields storage unit 404. For the single previous reference frame mode of operation, the inputs are taken from single previous frame content map storage unit 406 and single previous frame extrapolated motion field storage unit 408.

Although the figure illustrates the use of two different sets of storage units for storing content maps and motion fields—one set for where multiple reference frames are used (i.e., multiple previous frames' content maps storage unit 402 and multiple previous frames' extrapolated motion fields storage unit 404) and another for where a single reference frame is used (i.e., single previous frame content maps storage unit 406 and single previous frame extrapolated motion field storage unit 408), it should be noted that other configurations are possible. For example, the functionality of the two different content map storage units may be combined such that one storage unit may be used to store the content maps for multiple frames or a single content map for a single frame. Further, the storage units may also store data for the current frame as well.

The output from multiple reference frame mode controller module 414 as well as a current frame motion field storage unit (F_CURR MOTION FIELD) 410 and a current frame content map storage unit (F_CURR CONTENT MAP) 412 are fed into a motion vector extrapolation unit 416. Motion vector extrapolation unit 416 extracts the motion vectors as well as the supplemental information used for motion vector processing in system 300, as described herein. Thus, the input motion vectors utilized in system 300 may be from the current frame, or may be from both the current frame and one or more of the previously decoded frames. In addition, the other input to system 300 is side-band information from the decoded frame data, which may include, but is not limited to, the regions of interest, variations in texture information, and variations in luminance background values. This information may provide guidance for motion vector classification and adaptive smoothing algorithms, as further discussed below.

Figure 5:
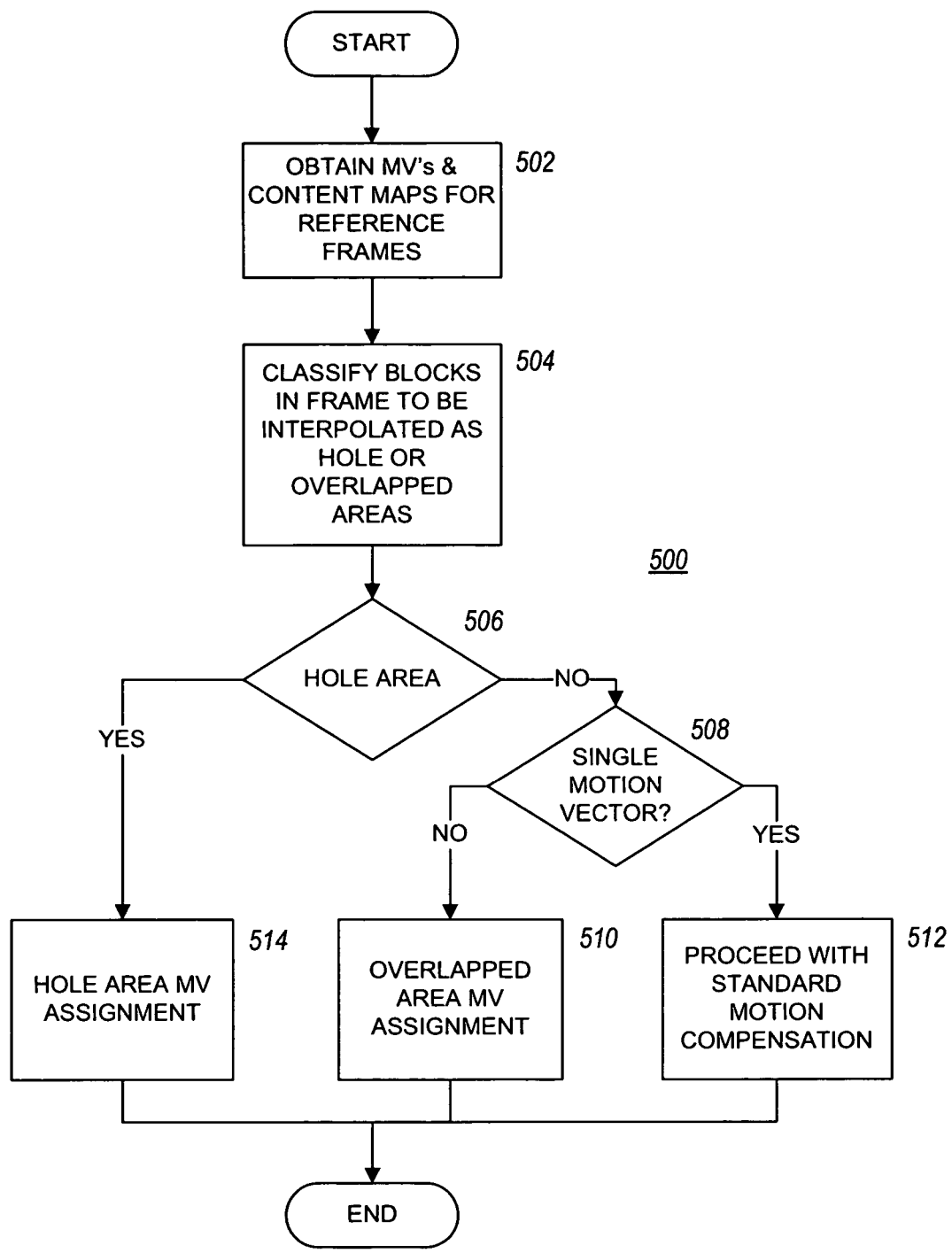
FIG. 5 is a flow diagram illustrating an overview of a method for motion vector assignment for overlapped and hole block regions.

FIG. 5 illustrates an overview of an exemplary motion vector assignment process 500, which starts with content maps and motion vectors for the reference frames used to interpolate the F frame being obtained in step 502. In one embodiment, where the process is being performed on a decoder on a client, the content maps and motion vectors have been previously transmitted from a server, as discussed above. In another embodiment, the content map or motion vectors may be generated on the client.

In step 504, each block in F frame (i.e., the frame to be interpolated), also referred to as "F frame block," "F frame macroblock," or "F_MB," are classified as either hole areas or overlapped areas. As further described herein, to determine if each block in the F frame contains an overlapped or hole area, the F frame is first divided into a series of non-overlapping blocks. It is then determined whether any motion vectors starting and ending on the reference frames between which the F frame is located passes through each non-overlapping block in the F frame. As discussed previously, overlapped areas are regions having multiple motion trajectories (i.e., multiple motion vectors) passing through it, while hole areas are regions having no motion trajectory passing through it (i.e., no motion vectors). Thus, if a block in the F frame has multiple motion vectors passing through it, it will be classified as containing an overlapped area, also referred to herein as an "overlapped area block" or "overlapped area." Further, the multiple motion vectors passing through a particular block, which causes the block to be an overlapped area block, will be referred to as a "set of overlapping motion vectors" for the block. This set of overlapping motion vectors will be subject to modification where certain motion vectors may be eliminated from the set of overlapping motion vectors, as further described below, and the modified set of motion vectors are referred to herein as a "processed set of overlapped motion vectors." In another embodiment, the set of overlapping motion vectors only contain motion vectors that meet certain criterion, and thus will be equal to the processed set of overlapped motion vectors. If a block does not have any motion vectors passing through it, it will be classified as a hole area, also referred to herein as a "hole area block" or "hole area." In one embodiment, a block having a single motion vector passing through it will not be classified as having a hole area. In another embodiment, these types of blocks will be classified as an overlapped area. Once blocks have been classified, the process continues with the motion assignment process, which depends on how a block is classified.

In step 506 it is determined if a block has been classified as a hole area. If so, then operation continues with step 514, where a motion vector assignment process for hole areas is performed. Otherwise, operation continues with step 508, where it is determined if only a single motion vector passes though the block in the F frame. If so, operation continues with step 512, where a standard motion compensation process occurs based on the single motion vector. If the block has been classified as an overlapped area, then operation continues with step 510, where a motion vector assignment process is performed for overlapped areas is performed.

Figure 6:
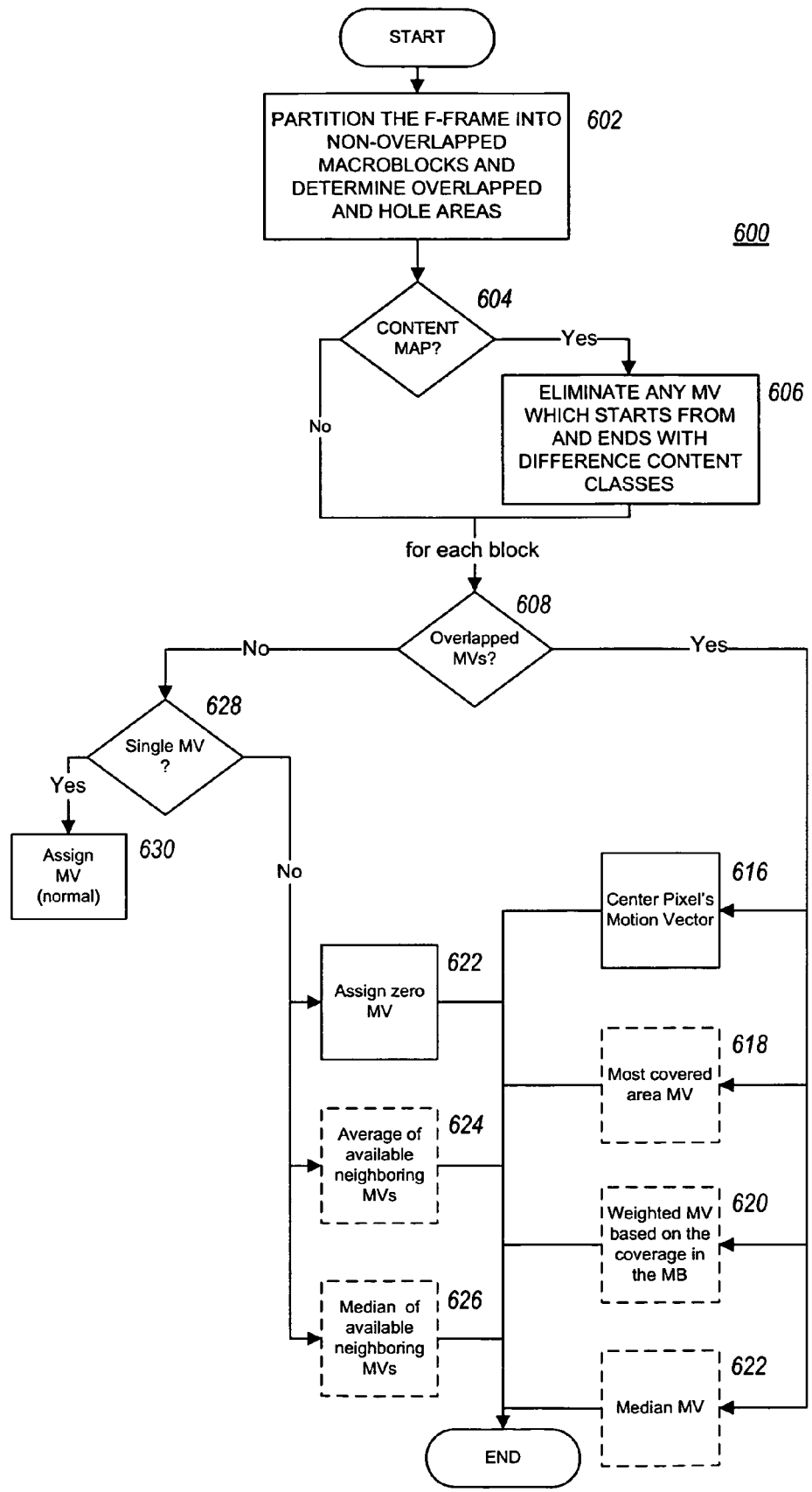
FIG. 6 is a flow diagram illustrating an operation of the FRUC system for motion vector assignment for overlapped and hole block regions.

FIG. 6 illustrates an exemplary motion vector assignment process, where the general motion vector assignment process described with reference to FIG. 5 is applied to the operation of FRUC system 300 for performing motion vector assignment for overlapped and hole blocks, where the system begins by first partitioning an F frame—in this case, a frame to be interpolated, into non-overlapping macroblocks (MBs) and assigning the hole area or overlapped area classifications to these blocks in step 602. In a fixed block size system, a frame must be divided into blocks of one fixed size. As described herein, a macroblock (MB) refers to a 16×16-sized block. However, the description herein may apply to other sized blocks. Further, in a system that supports variable block sizes, a frame may be divided into blocks that have different sizes and shapes. For video codecs that support variable block sizes, system 300 can also perform motion vector assignment for the motion vectors associated with these blocks. One such standard is the H.264 standard, as mentioned above, which supports block sizes of 16×16, 16×8, 8×16, 8×8, 8×4, 4×8, and 4×4.

Once the F frame has been partitioned, the blocks are classified as hole or overlapped areas in a manner as discussed above, where all the motion vectors that belong to an overlapping area block are grouped into respective sets, operation continues with block 604, where FRUC system 300 determines if content maps exist for the reference frames.

It is important for the content in a frame to be classified as part of the motion vector assignment process described herein. Based on the received video stream metadata (i.e., transmitted motion vectors) and the decoded data (i.e., reconstructed frame pixel values), the content in a frame can be classified into the following class types:
 1. static background (SB);
 2. moving object (MO);
 3. appearing object AO);
 4. disappearing object (DO); and,
 5. edges (EDGE).

Thus, the class type of the region of the frame at which the current motion vector is pointing—i.e., the macroblock or block, is analyzed and will affect the processing of the frames that are to be interpolated. The introduction of EDGE class to the content classification adds an additional class of content classification and provides an improvement in the FRUC process, as described herein.

Figure 7:
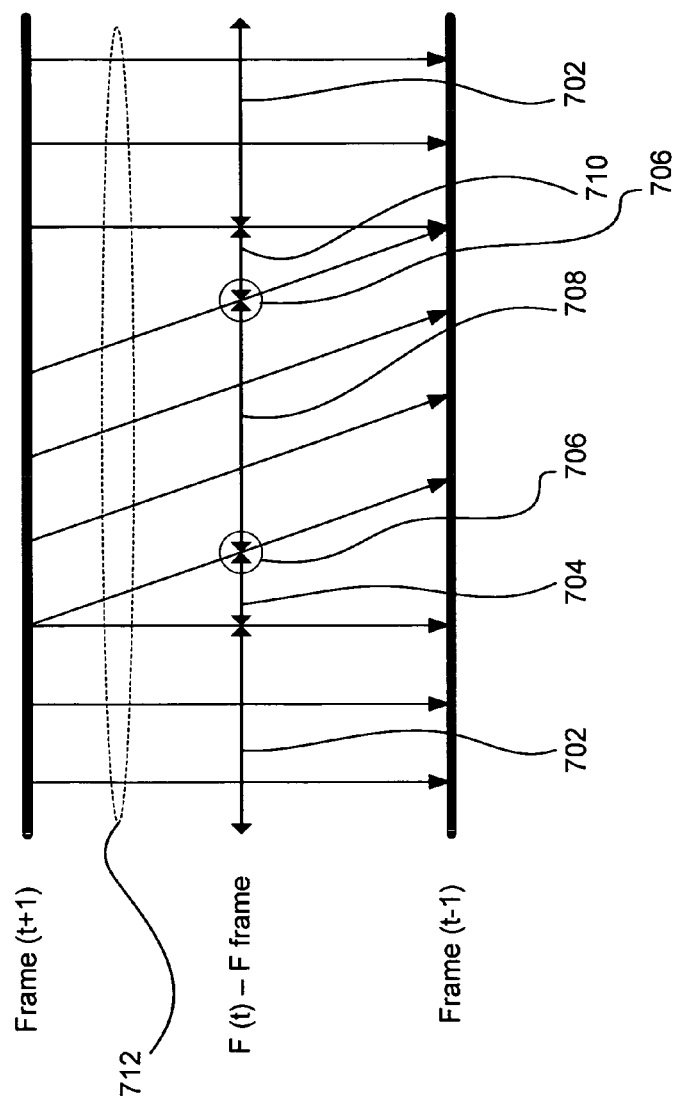
FIG. 7 is a figure illustrating the various content classes assigned to the graphic elements inside a video frame; and, FIG. 8 is a flow diagram illustrating an operation of the FRUC system for motion vector assignment for overlapped and hole pixel regions; and, FIG. 9 is a block diagram of an access terminal and an access point of a wireless system.

FIG. 7 provides an illustration of the different classes of pixels or regions, including a moving object (MO) 708, an appearing object (AO) 704, a disappearing object (DO) 710, a static background (SB) 702 and an EDGE 706 classes for MCI, where a set of arrows 712 denotes the motion trajectory of the pixels in the three illustrated frames: Frame (t−1), Frame (t) (F Frame) and Frame (t+1). Specifically, in the context of MCI, each pixel or region inside each video frame can be classified into one of the above-listed five classes and an associated motion vector may be processed in a particular fashion based on a comparison of the change (if any) of class type information, as further described below. In addition, the above-mentioned five content classifications can be group into three less-restricted classes when the differences between the SB, AO and DO classes are minor:
 1. SB 702, AO 704, DO 710;
 2. MO 708; and,
 3. EDGE 706.

In one embodiment, two different approaches are used to perform the classification of DO 710, SB 702, AO 704 and MO 708 content, each based on different computational complexities. In the low-complexity approach, for example, the following formulas may be used to classify content:
 $Qc=abs(Fc[yn][xn]-Fp[yn][xn])$;
 $Qp=abs(Fp[yn][xn]-Fpp[yn][xn])$;
 $Qc=(Qc>threshold)$; and,
 $Qp=(Qp>threshold)$;
where:
 yn and xn are the y and x coordination positions of the pixel;
 Fc is the current frame's pixel value;
 Fp is the previous frame's pixel value;
 Fpp is the previous-previous frame pixel value;
 Qc is the absolute pixel value difference between collocated pixels (located at [yn][xn]) in current- and previous frames; and, Qp is the absolute pixel value difference between collocated pixels (located at [yn][xn]) in previous- and previous-previous frames;
and:
if (Qc && Qp) then classify as moving object;
else if (!Qc && !Qp) then classify as stationary background;
else if (Qc && !Qp) then classify as disappearing object;
else if (!Qc && Qp) the classify as appearing object.

In the high-complexity approach, for example, classification is based on object segmentation and morphological operations, with the content classification being performed by tracing the motion of the segmented object. Thus:
1. perform object segmentation on the motion field;
2. trace the motion of the segmented object (e.g., by morphological operations); and,
3. mark the object as SB, AO, DO, and MO, respectively.

In step 606, after content maps are determined to exist for the reference frames, the FRUC system will eliminate, for each overlapped area macroblock in the F frame, any motion vectors from the set of overlapped motion vectors belonging to the overlapped area block that starts from or ends with different content classes. Specifically, by using the content map of each reference frame to determine the content type of each macroblock in that reference frame, where each macroblock is classified to be one of the MO, SB, AO, DO and EDGE classes (or into three classes where differences between the SB, AO and DO classes are minor) as described above, it can be determined if any motion vector in the set of overlapping motion vectors (i.e., previously having been defined as all motion vectors passing through an overlapped area block) start and end with macroblocks having different content classes. For example, a motion vector having its starting point touching a macroblock in Frame (T+1) classified as a MO macroblock but its ending point touching a macroblock in Frame (T−1) classified as a SB macroblock would be such a motion vector. In one embodiment, any motion vector is eliminated from the set of overlapped motion vectors if that motion vector's starting and ending points belong to different content classes. As defined previously, the motion vectors that have not been eliminated are the processed set of motion vectors.

Once the motion vectors having starting and ending points associated with macroblocks classified in different classes have been removed from the set of overlapped motion vectors and the processed set of motion vectors created, operation continues with decision block 608, where it is determined if the macroblock to be assigned a motion vector is an overlapped area macroblock.

Motion Vector Assignment for Overlapped MB

In step 608, it is determined whether the processed set of overlapped motion vectors for each macroblock contains more than one overlapped motion vector. If so, then in one embodiment operation continues with step 616, where the motion vector(s) passing through the center pixel is used in the assignment of the motion vector to the macroblock. In another embodiment, as noted in step 618, the assignment is based on a most covered area determination. In yet another embodiment, as noted in step 620, a weighted motion vector is assigned, the weighted motion vector being created based on the coverage in the overlapped area macroblock. In still yet another embodiment, as noted in step 622, a median motion vector is assigned. Each of these embodiments are described below.

Assign MV Based on the Center Pixel's MV:

In one embodiment, the motion vector assignment is based on determining the motion vector that passes through the center pixel of the macroblock. The sequence including the following steps:
1. start with the current MB(x/block_size, y/block_size) in the current frame, where (x,y) is the center pixel location of the current macro block;
2. calculate the current motion vector (dx, dy) of the MB(x, y)
3. scale the motion vector proportionally, for 1:2 FRUC case, where the F frame is exactly between the current frame and the previous reference frame, it is (dx/2, dy/2)
4. the MB in the F-frame, MB_f((x+dx/2)/block_size, (y+dy/2)/block_size) will be assignned the MV(dx/2, dy/2)
5. if there are more than one MVs assigned to the same MB in the F-frame, an averaging or median operation will be performed to obtain the final seed MV.

Assign MV Based on the MB that Covers Most of the Area:

In another embodiment, the motion vector assignment is based on determining the motion vector with an associated macroblock that covers the most area of the F frame's macroblock. The steps are as follows:
1. current MB(x/block_size, y/block_size) in the current frame, where (x,y) is its center pixel location
2. current MV(dx, dy) of the MB(x,y)
3. scale the MV proportionally, for 1:2 FRUC case, it is (dx/2, dy/2)
4. the MV(dx, dy) passes thru the F-frame, the intersection location in F-frame is (x+dx/2, y+dy/2)
5. find the up to four MBs in F-frame overlay with the MB centered around (x+dx/2, y+dy/2)
    a. F_MB_1(x1, y1); where x1=((int)(x+dx/2)/block_size)*block_size+block_size/2; y1=((int)(y+dy/2)/block_size)*block_size+block_size/2;
    b. F_MB_2(x2, y2); where x2=x1+block_size; y2=y1;
    c. F_MB_3(x3, y3); where x3=x1+block_size; y3=y1+block_size;
    d. F_MB_4 (x4, y4); where x4=x1; y4=y1+block_size;
6. find up to four areas within the four F_MBs covered by the MB centered around (x+dx/2, y+dy/2), and associated all the calculated areas with MV (dx/2, dy/2)
    a. Area_MB_1=(block_size−(x+dx/2−x1))*(block_size−(y+dy/2−y1))
    b. Area_MB_2=(block_size−(x+dx/2−x2))*(block_size−(y+dy/2−y2))
    c. Area_MB_3=(block_size−(x+dx/2−x3))*(block_size−(y+dy/2−y3))
    d. Area_MB_4=(block_size−(x+dx/2−x4))*(block_size−(y+dy/2−y4))
7. for each F_MB in the F-frame, pick the MV which gives the largest area.

Weighted Average MV Assignment:

In still yet another embodiment, the motion vector assignment is based on a weighted average of the macroblocks that cover the macroblock. The steps are as follows:
1. current MB(x/block_size, y/block_size) in the current frame, where (x,y) is its center pixel location
2. current MV(dx, dy) of the MB(x,y)
3. scale the MV proportionally, for 1:2 FRUC case, it is (dx/2, dy/2)
4. the MV(dx, dy) passes thru the F-frame, the intersection location in F-frame is (x+dx/2, y+dy/2)
5. find the up to four MBs in F-frame overlay b with the MB centered around (x+dx/2, y+dy/2)

a. F_MB_1(x1, y1); x1=((int)(x+dx/2)/block_size)*block_size+block_size/2; y1=((int)(y+dy/2)/block_size)*block_size+block_size/2;
b. F_MB_2(x2, y2); x2=x1+block_size; y2=y1;
c. F_MB_3(x3, y3); x3=x1+block_size; y3=y1+block_size;
d. F_MB_4(x4, y4); x4=x1; y4=y1+block_size;

6. find up to four areas within the four F_MBs covered by the MB centered around (x+dx/2, y+dy/2), and associated all the calculated areas with MV (dx/2, dy/2)
   a. Area_MB_1=(block_size−(x+dx/2−x1))*(block_size−(y+dy/2−y1))
   b. Area_MB_2=(block_size−(x+dx/2−x2))*(block=size−(y+dy/2−y2))
   c. Area_MB_3=(block_size−(x+dx/2−x3))*(block_size−(y+dy/2−y3))
   d. Area_MB_4=(block_size−(x+dx/2−x4))*(block=size−(y+dy/2−y4))

7. if N MVs pass thru a F_MB, then assign the weighted MV to the F_MB
MV=w_1*MV1+w_2*MV_2+ . . . +w_N*MV_N
where the w_i is the weighting factor:
w_i=area_i/block_size/block_size;

In step 628, where it has been previously determined in step 608 that the F frame macroblock does not have any overlapped motion vectors, the system determines if the F frame macroblock has a single motion vector passing through it (i.e., whether there is only one motion vector in the processed set of motion vectors). If so, then operation continues with step 630, where a normal motion vector assignment is performed. Otherwise, the F frame macroblock is determined to not have any motion vectors passing through it and operation continues with step 622, where in one embodiment a motion vector with a zero value is assigned to the F frame macroblock. In another embodiment, as noted in step 624, the F frame macroblock is assigned a motion vector that is an average of the available motion vectors neighboring the macroblock. In yet another embodiment, as noted in step 626, the F frame macroblock is assigned a motion vector that is the median of the available motion vectors neighboring the macroblock.

It should be noted that although the motion vector assignment process in FIG. 6 begins with examining whether the F frame macroblock is an overlapped area macroblock, the process should be understood to apply equally where the F frame macroblock is a hole area macroblock or where there is only one motion vector passing through the F frame macroblock and such changes to the process flow are well within the capabilities of those of ordinary skill in the art to implement.

Figure 8:
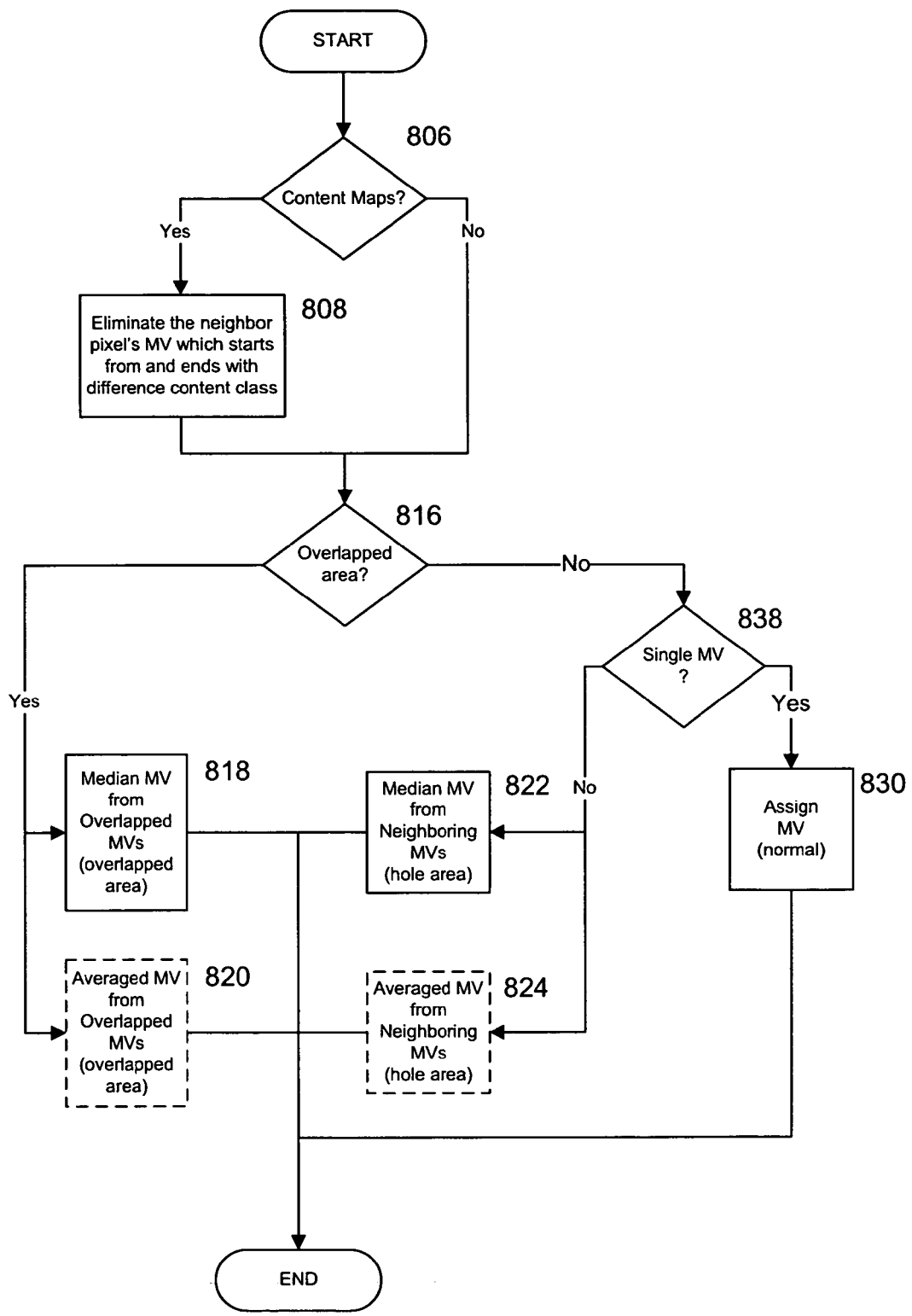

FIG. 8 illustrates a pixel-based, rather than a block-based, motion vector assignment process for FRUC system 300, where, similar to step 604 of FIG. 6, it is determined in step 806 whether the content maps exist for the reference frames. If so, then similar to step 606 of FIG. 6, any neighboring motion vectors starting from and ending in different content classes are eliminated in step 808. Operation then continues with step 816, where it is determined the pixel is overlapped. If so, then operation continues with step 818, where a median motion vector, based on a median of the overlapped motion vectors that have not been eliminated based on the different content class ending points, is assigned to the pixel. In another embodiment, as noted in step 820, an average motion vector, based on an average of the overlapped motion vectors that have not been eliminated based on the different content class ending points, is assigned to the pixel.

Where the F frame pixel is not an overlapped area, then in step 828 it is determined if a single motion vector passes through the pixel. If so, then operation continues with step 830, where the pixel is assigned with the motion vector passing through it. Otherwise, the pixel is determined to be hole area and operation continues with step 822, where a median motion vector, based on a median of neighboring motion vectors is assigned to the pixel. In another embodiment, as noted in step 820, an average motion vector, based on an average of the neighboring motion vectors, is assigned to the pixel. It should be noted that the neighboring motion vectors that may be used in the median and average motion vector assignment may be subject to the elimination based on the different starting and ending point content classes.

Figure 9:
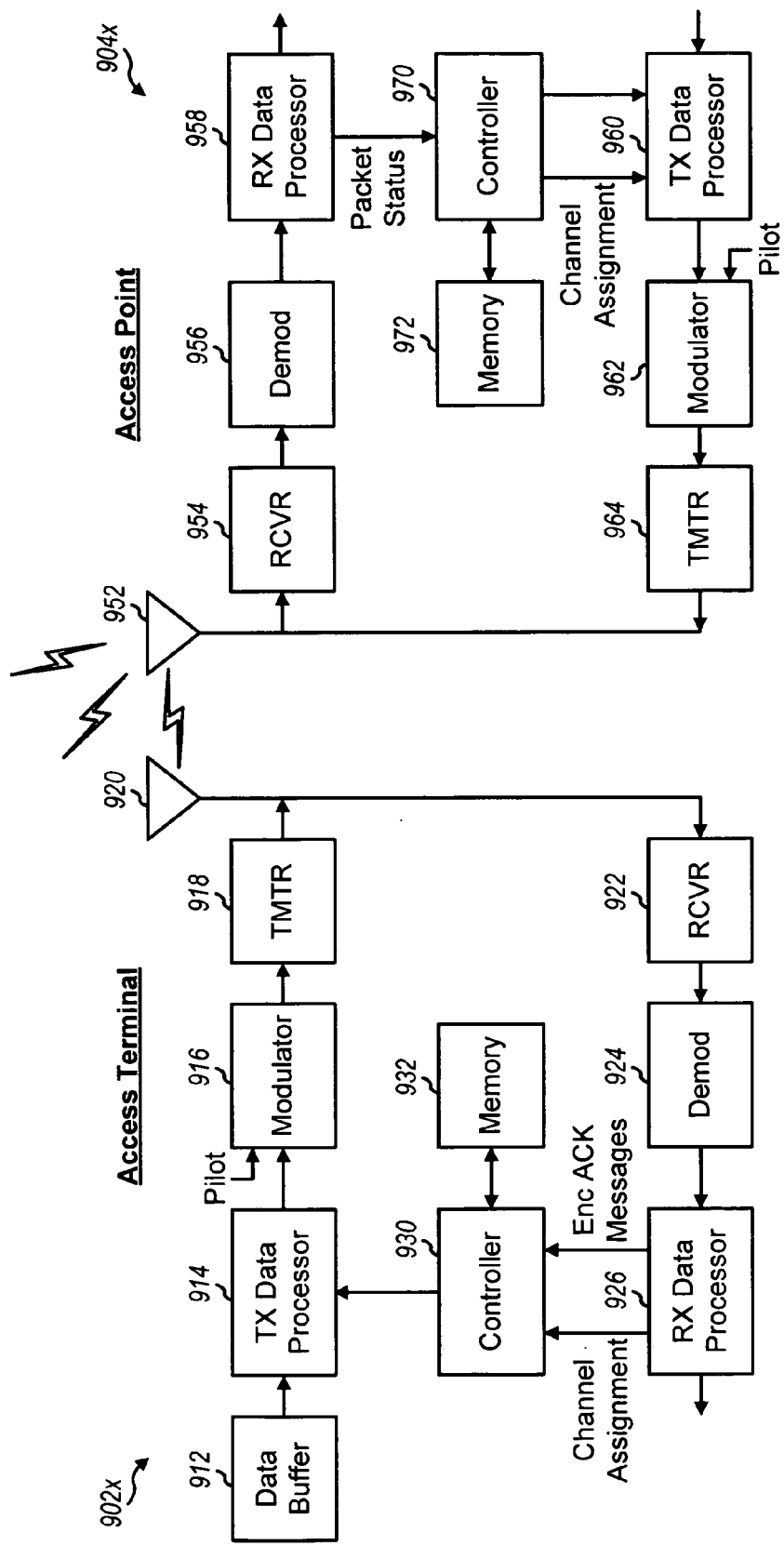

FIG. 9 shows a block diagram of an access terminal 902x and an access point 904x in a wireless system. An "access terminal," as discussed herein, refers to a device providing voice and/or data connectivity to a user. The access terminal may be connected to a computing device such as a laptop computer or desktop computer, or it may be a self contained device such as a personal digital assistant. The access terminal can also be referred to as a subscriber unit, mobile station, mobile, remote station, remote terminal, user terminal, user agent, or user equipment. The access terminal may be a subscriber station, wireless device, cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem. An "access point," as discussed herein, refers to a device in an access network that communicates over the air-interface, through one or more sectors, with the access terminals. The access point acts as a router between the access terminal and the rest of the access network, which may include an IP network, by converting received air-interface frames to IP packets. The access point also coordinates the management of attributes for the air interface.

For the reverse link, at access terminal 902x, a transmit (TX) data processor 914 receives traffic data from a data buffer 912, processes (e.g., encodes, interleaves, and symbol maps) each data packet based on a selected coding and modulation scheme, and provides data symbols. A data symbol is a modulation symbol for data, and a pilot symbol is a modulation symbol for pilot (which is known a priori). A modulator 916 receives the data symbols, pilot symbols, and possibly signaling for the reverse link, performs (e.g., OFDM) modulation and/or other processing as specified by the system, and provides a stream of output chips. A transmitter unit (TMTR) 918 processes (e.g., converts to analog, filters, amplifies, and frequency upconverts) the output chip stream and generates a modulated signal, which is transmitted from an antenna 920.

At access point 904x, the modulated signals transmitted by access terminal 902x and other terminals in communication with access point 904x are received by an antenna 952. A receiver unit (RCVR) 954 processes (e.g., conditions and digitizes) the received signal from antenna 952 and provides received samples. A demodulator (Demod) 956 processes (e.g., demodulates and detects) the received samples and provides detected data symbols, which are noisy estimate of the data symbols transmitted by the terminals to access point 904x. A receive (RX) data processor 958 processes (e.g., symbol demaps, deinterleaves, and decodes) the detected data symbols for each terminal and provides decoded data for that terminal.

For the forward link, at access point 904x, traffic data is processed by a TX data processor 960 to generate data symbols. A modulator 962 receives the data symbols, pilot symbols, and signaling for the forward link, performs (e.g., OFDM) modulation and/or other pertinent processing, and provides an output chip stream, which is further conditioned by a transmitter unit 964 and transmitted from antenna 952. The forward link signaling may include power control commands generated by a controller 970 for all terminals transmitting on the reverse link to access point 904x. At access terminal 902x, the modulated signal transmitted by access point 904x is received by antenna 920, conditioned and digitized by a receiver unit 922, and processed by a demodulator 924 to obtain detected data symbols. An RX data processor 926 processes the detected data symbols and provides decoded data for the terminal and the forward link signaling. Controller 930 receives the power control commands, and controls data transmission and transmit power on the reverse link to access point 904x. Controllers 930 and 970 direct the operation of access terminal 902x and access point 904x, respectively. Memory units 932 and 972 store program codes and data used by controllers 930 and 970, respectively.

The disclosed embodiments may be applied to any one or combinations of the following technologies: Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It should be noted that the methods described herein may be implemented on a variety of communication hardware, processors and systems known by one of ordinary skill in the art. For example, the general requirement for the client to operate as described herein is that the client has a display to display content and information, a processor to control the operation of the client and a memory for storing data and programs related to the operation of the client. In one embodiment, the client is a cellular phone. In another embodiment, the client is a handheld computer having communications capabilities. In yet another embodiment, the client is a personal computer having communications capabilities. In addition, hardware such as a GPS receiver may be incorporated as necessary in the client to implement the various embodiments described herein. The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, e.g., in an instant messaging service or any general wireless data communication applications, without departing from the spirit or scope of the novel aspects described herein. Thus, the scope of the novel aspects of the embodiments is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments. Accordingly, the scope of the novel aspects of the embodiments is to be defined solely by the scope of the following claims.

What is claimed is:

1. A method for processing a plurality of motion vectors for a video frame to be interpolated using a first reference frame and a second reference frame, each reference frame having a content map, the method comprising:
   with a processor, partitioning the video frame to be interpolated into a plurality of areas;
   with the processor, determining a number of motion vectors passing through one area of the plurality of areas based on the content maps of the first reference frame and the second reference frame, wherein each content map comprises a plurality of content classes, wherein the plurality of content classes comprises an edge content class and a background content class, and wherein the background content class comprises an appearing object class, a disappearing object class and a static background class; and
   with the processor, generating a motion vector for assigning to the one area based on the number of motion vectors passing through the one area.

2. The method of claim 1, wherein partitioning the video frame to be interpolated into the plurality of areas comprises partitioning the video frame to be interpolated into a plurality of non-overlapping areas.

3. The method of claim 1, wherein partitioning the video frame to be interpolated into the plurality of areas comprises partitioning the video frame to be interpolated into a plurality of overlapping areas.

4. The method of claim 1, wherein generating the motion vector to the one area based on the number of motion vectors passing through the one area comprises selecting one of the number of motion vectors passing through the one area.

5. The method of claim 1, wherein partitioning the video frame to be interpolated into the plurality of areas comprises partitioning the video frame to be interpolated into a plurality of areas of a fixed size.

6. The method of claim 1, wherein partitioning the video frame to be interpolated into the plurality of areas comprises partitioning the video frame to be interpolated into a plurality of areas of different sizes.

7. The method of claim 1, wherein partitioning the video frame to be interpolated into the plurality of areas comprises partitioning the video frame to be interpolated into a plurality of pixels.

8. The method of claim 1, wherein determining the number of motion vectors passing through the one area of the plurality of areas based on the content maps of the first reference frame and the second reference frame comprises:
for each motion vector passing through the one area:
determining a motion vector starting point content class and a motion vector ending point content class;
comparing the motion vector starting point content class and the motion vector ending point content class; and
removing the motion vector from being considered in the number of motion vectors passing through the one area if the motion vector starting point content class and the motion vector ending point content class are different.

9. The method of claim 1, wherein generating the motion vector for assigning to the one area based on the number of motion vectors passing through the one area comprises assigning the one area with a motion vector selected from a group consisting of: (i) a zero motion vector, (ii) an average of any available neighboring motion vectors, and (iii) a median of any available neighboring motion vectors; if the number of motion vectors passing through the one area is zero.

10. The method of claim 1, wherein generating the motion vector for assigning to the one area based on the number of motion vectors passing through the one area comprises assigning the one area with a motion vector selected from a group consisting of: (i) a center pixel motion vector, (ii) a most covered area motion vector, (iii) a weighted motion vector, and (iv) a median motion vector; if the number of motion vectors passing through the one area is greater than one.

11. The method of claim 1, wherein the plurality of content classes comprises a moving object content class.

12. A non-transitory computer readable storage medium having instructions stored thereon for causing a computer to execute a method for processing a plurality of motion vectors for a video frame to be interpolated using a first reference frame and a second reference frame, each reference frame having a content map, the method comprising:
partitioning the video frame to be interpolated into a plurality of areas;
determining a number of motion vectors passing through one area of the plurality of areas based on the content maps of the first reference frame and the second reference frame, wherein each content map comprises a plurality of content classes, wherein the plurality of content classes comprises an edge content class and a background content class, and wherein the background content class comprises an appearing object class, a disappearing object class and a static background class; and
generating a motion vector for assigning to the one area based on the number of motion vectors passing through the one area.

13. The non-transitory computer readable storage medium of claim 12, wherein partitioning the video frame to be interpolated into the plurality of areas comprises partitioning the video frame to be interpolated into a plurality of non-overlapping areas.

14. The non-transitory computer readable storage medium of claim 12, wherein partitioning the video frame to be interpolated into the plurality of areas comprises partitioning the video frame to be interpolated into a plurality of overlapping areas.

15. The non-transitory computer readable storage medium of claim 12, wherein generating the motion vector to the one area based on the number of motion vectors passing through the one area comprises selecting one of the number of motion vectors passing through the one area.

16. The non-transitory computer readable storage medium of claim 12, wherein partitioning the video frame to be interpolated into the plurality of areas comprises partitioning the video frame to be interpolated into a plurality of areas of a fixed size.

17. The non-transitory computer readable storage medium of claim 12, wherein partitioning the video frame to be interpolated into the plurality of areas comprises partitioning the video frame to be interpolated into a plurality of areas of different sizes.

18. The non-transitory computer readable storage medium of claim 12, wherein partitioning the video frame to be interpolated into the plurality of areas comprises partitioning the video frame to be interpolated into a plurality of pixels.

19. The non-transitory computer readable storage medium of claim 12, wherein determining the number of motion vectors passing through the one area of the plurality of areas based on the content maps of the first reference frame and the second reference frame comprises:
for each motion vector passing through the one area:
determining a motion vector starting point content class and a motion vector ending point content class;
comparing the motion vector starting point content class and the motion vector ending point content class; and
removing the motion vector from being considered in the number of motion vectors passing through the one area if the motion vector starting point content class and the motion vector ending point content class are different.

20. The non-transitory computer readable storage medium of claim 12, wherein generating the motion vector for assigning to the one area based on the number of motion vectors passing through the one area comprises assigning the one area with a motion vector selected from a group consisting of: (i) a zero motion vector, (ii) an average of any available neighboring motion vectors, and (iii) a median of any available neighboring motion vectors; if the number of motion vectors passing through the one area is zero.

21. The non-transitory computer readable storage medium of claim 12, wherein generating the motion vector for assigning to the one area based on the number of motion vectors passing through the one area comprises assigning the one area with a motion vector selected from a group consisting of: (i) a center pixel motion vector, (ii) a most covered area motion vector, (iii) a weighted motion vector, and (iv) a median motion vector; if the number of motion vectors passing through the one area is greater than one.

22. The non-transitory computer readable storage medium of claim 12, wherein the plurality of content classes comprises a moving object content class.

23. An apparatus for processing a plurality of motion vectors for a video frame to be interpolated using a first reference frame and a second reference frame, each reference frame having a content map, comprising:
- means for partitioning the video frame to be interpolated into a plurality of areas;
- means for determining a number of motion vectors passing through one area of the plurality of areas based on the content maps of the first reference frame and the second reference frame, wherein each content map comprises a plurality of content classes, wherein the plurality of content classes comprises an edge content class and a background content class, and wherein the background content class comprises an appearing object class, a disappearing object class and a static background class; and
- means for generating a motion vector for assigning to the one area based on the number of motion vectors passing through the one area.

24. The apparatus of claim 23, wherein the means for partitioning the video frame to be interpolated into the plurality of areas comprises means for partitioning the video frame to be interpolated into a plurality of non-overlapping areas.

25. The apparatus of claim 23, wherein the means for partitioning the video frame to be interpolated into the plurality of areas comprises means for partitioning the video frame to be interpolated into a plurality of overlapping areas.

26. The apparatus of claim 23, wherein the means for generating the motion vector to the one area based on the number of motion vectors passing through the one area comprises means for selecting one of the number of motion vectors passing through the one area.

27. The apparatus of claim 23, wherein the means for partitioning the video frame to be interpolated into the plurality of areas comprises means for partitioning the video frame to be interpolated into a plurality of areas of a fixed size.

28. The apparatus of claim 23, wherein the means for partitioning the video frame to be interpolated into the plurality of areas comprises means for partitioning the video frame to be interpolated into a plurality of areas of different sizes.

29. The apparatus of claim 23, wherein the means for partitioning the video frame to be interpolated into the plurality of areas comprises means for partitioning the video frame to be interpolated into a plurality of pixels.

30. The apparatus of claim 23 wherein the means for determining the number of motion vectors passing through the one area of the plurality of areas based on the content maps of the first reference frame and the second reference frame comprises:
- means for determining a motion vector starting point content class and a motion vector ending point content class;
- means for comparing the motion vector starting point content class and the motion vector ending point content class; and
- means for removing the motion vector from being considered in the number of motion vectors passing through the one area if the motion vector starting point content class and the motion vector ending point content class are different.

31. The apparatus of claim 23, wherein the means for generating the motion vector for assigning to the one area based on the number of motion vectors passing through the one area comprises means for assigning the one area with a motion vector selected from a group consisting of: (i) a zero motion vector, (ii) an average of any available neighboring motion vectors, and (iii) a median of any available neighboring motion vectors; if the number of motion vectors passing through the one area is zero.

32. The apparatus of claim 23, wherein the means for generating the motion vector for assigning to the one area based on the number of motion vectors passing through the one area comprises means for assigning the one area with a motion vector selected from a group consisting of: (i) a center pixel motion vector, (ii) a most covered area motion vector, (iii) a weighted motion vector, and (iv) a median motion vector; if the number of motion vectors passing through the one area is greater than one.

33. The apparatus of claim 23, wherein the plurality of content classes comprises a moving object content class.

34. At least one processor configured to implement a method for processing a plurality of motion vectors for a video frame to be interpolated using a first reference frame and a second reference frame, each reference frame having a content map, the method comprising:
- partitioning the video frame to be interpolated into a plurality of areas;
- determining a number of motion vectors passing through one area of the plurality of areas based on the content maps of the first reference frame and the second reference frame, wherein each content map comprises a plurality of content classes, wherein the plurality of content classes comprises an edge content class and a background content class, and wherein the background content class comprises an appearing object class, a disappearing object class and a static background class; and
- generating a motion vector for assigning to the one area based on the number of motion vectors passing through the one area.

35. The at least one processor of claim 34, wherein partitioning the video frame to be interpolated into the plurality of areas comprises partitioning the video frame to be interpolated into a plurality of non-overlapping areas.

36. The at least one processor of claim 34, wherein partitioning the video frame to be interpolated into the plurality of areas comprises partitioning the video frame to be interpolated into a plurality of overlapping areas.

37. The at least one processor of claim 34, wherein generating the motion vector to the one area based on the number of motion vectors passing through the one area comprises selecting one of the number of motion vectors passing through the one area.

38. The at least one processor of claim 34, wherein partitioning the video frame to be interpolated into the plurality of areas comprises partitioning the video frame to be interpolated into a plurality of areas of a fixed size.

39. The at least one processor of claim 34, wherein partitioning the video frame to be interpolated into the plurality of areas comprises partitioning the video frame to be interpolated into a plurality of areas of different sizes.

40. The at least one processor of claim 34, wherein partitioning the video frame to be interpolated into the plurality of areas comprises partitioning the video frame to be interpolated into a plurality of pixels.

41. The at least one processor of claim 34, wherein determining the number of motion vectors passing through the one area of the plurality of areas based on the content maps of the first reference frame and the second reference frame comprises:

for each motion vector passing through the one area:
  determining a motion vector starting point content class and a motion vector ending point content class;
  comparing the motion vector starting point content class and the motion vector ending point content class; and
  removing the motion vector from being considered in the number of motion vectors passing through the one area if the motion vector starting point content class and the motion vector ending point content class are different.

42. The at least one processor of claim 34, wherein generating the motion vector for assigning to the one area based on the number of motion vectors passing through the one area comprises assigning the one area with a motion vector selected from a group consisting of: (i) a zero motion vector, (ii) an average of any available neighboring motion vectors, and (iii) a median of any available neighboring motion vectors; if the number of motion vectors passing through the one area is zero.

43. The at least one processor of claim 34, wherein generating the motion vector for assigning to the one area based on the number of motion vectors passing through the one area comprises assigning the one area with a motion vector selected from a group consisting of: (i) a center pixel motion vector, (ii) a most covered area motion vector, (iii) a weighted motion vector, and (iv) a median motion vector; if the number of motion vectors passing through the one area is greater than one.

44. The at least one processor of claim 34, wherein the plurality of content classes comprises a moving object content class.

* * * * *